Figure 1:
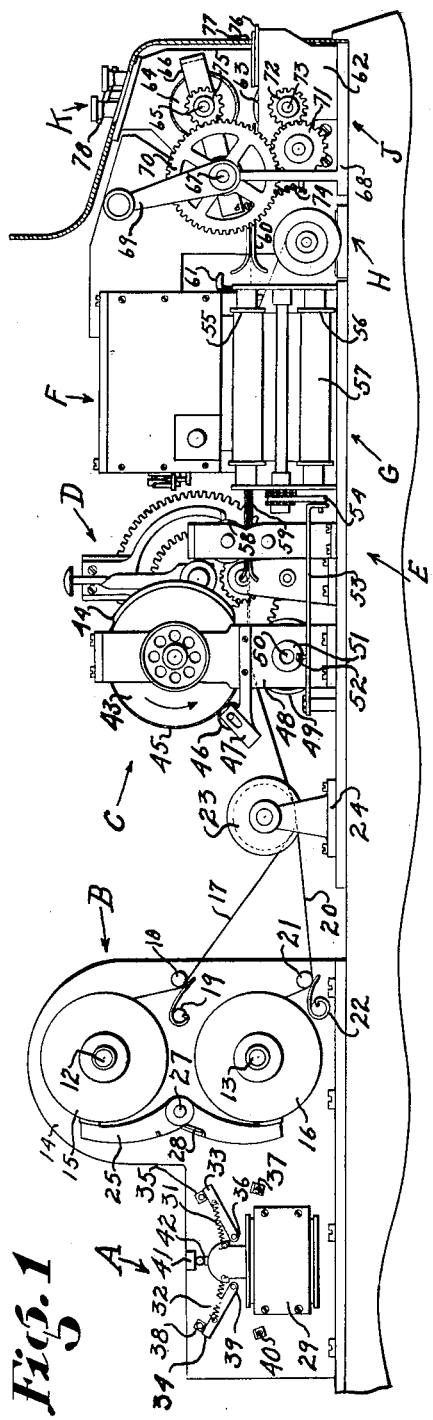

June 19, 1934.    G. W. LAWRENCE    1,963,205
PAPER FEED FOR PARCEL POST MACHINES
Filed Oct. 23, 1931    4 Sheets-Sheet 1

INVENTOR
George W. Lawrence.,
BY
Clarence B Foster
ATTORNEY

June 19, 1934.   G. W. LAWRENCE   1,963,205
PAPER FEED FOR PARCEL POST MACHINES
Filed Oct. 23, 1931   4 Sheets-Sheet 3

INVENTOR
George W. Lawrence,
BY
Clarence B. Foster
ATTORNEY

Patented June 19, 1934

1,963,205

UNITED STATES PATENT OFFICE 1,963,205

PAPER FEED FOR PARCEL POST MACHINES

George W. Lawrence, Los Angeles, Calif., assignor to William J. Pearson, Los Angeles, Calif.

Application October 23, 1931, Serial No. 570,630

2 Claims. (Cl. 192—127)

This invention relates to paper feeds for parcel post machines designed to be used in conjunction with a parcel post machine such as is disclosed in a co-pending application, Serial Number 367,106, filed May 29, 1929, by William J. Pearson, entitled Parcel post weighing and stamp printing machine, which is designed to weigh parcel post packages and to print postage stamps of the prepaid metered type.

The parcel post weighing and stamp printing machine just recited is designed for printing purposes, more particularly the printing of metered parcel post stamps wherein it may be required to print a stamp bearing the name of the place of original mailing, the date, the zone number to which the package is addressd, the weight of the package, the monetary value of the stamp derived from the weight and the zone, a serial number, and such other words, phrases, figures, decorations, and designations as it may be desired to print. This mechanism is used in conjunction with a scale, printing mechanism, and meters, and may be motor driven and used for any printing purpose. This mechanism is more particularly designed for the purpose of printing stamps within the postal limits, as in use at the present time, namely, from 7 cents to $6.01 inclusive, the machine described having a total capacity of $9.99, but may be constructed for any capacity desired.

This mechanism is particularly adapted for the printing of parcel post stamps upon a paper strip or strips, one of which is gummed for the purpose of adhering to a package, and the other strip is composed of plain paper; the stamp when printed is cut to the proper stamp length and may be moistened on the gummed side at the delivery point of the machine, and in this condition attached to the package to be mailed; the duplicate stamp may either be cut to a stamp length and delivered from the machine at the same time that the stamp is delivered, or it may be wound upon a spindle within the machine adapted to be removed when desired.

This mechanism is also designed to be used in conjunction with a metering or registering device which continuously records within a set of numeral wheels constituting the meter the monetary values of the stamps printed; and also with a control meter which may be set for a predetermined monetary value and which, upon exhaustion of the said amount, will function to actuate locking mechanism adapted to lock the entire machine against operation until again so set, and may be so constructed as to actuate any other mechanism that may be desired.

This machine includes a printing mechanism comprising the peculiar features required by the operation of a machine for the purposes as set forth and to produce the said results, wherein multiple type may be set by a single keyboard successively for printing purposes, which type may be returned to the original position at the will of the operator, and which will be automatically returned to the original position at the completion of a printing operation; this mechanism includes a series of printing wheels actuated by a keyboard mechanism to be rotated to a position corresponding to the numbers put into the keyboard successively and in order, presenting certain type faces in printing relation to the paper tapes situated above a platen. The said platen is provided for the type to operate against for printing purposes and includes a duplicating mechanism composed of an ink rbbon and spools for winding the ribbon, the winding mechanism and reversing mechanism for the ribbon, and runways or guides for the paper strips to pass through under the printer, thus placing the ribbon between the two paper strips, and allowing the type to print a duplicate stamp by means of the force of the blow delivered by the type against the platen.

The machine also incorporates in the numeral printer an inking device for inking the type faces of the numeral wheels, wherein there is a reservoir for holding a supply of ink, means to feed the ink to the surface of a pad, and a roller operating in tracks for the purpose of carrying the ink from the pad to the type faces, and properly and evenly inking the said type faces.

The numeral printer contains a removable dater device, which may be removed from the printer for the purpose of re-setting the type for the current date; a serial numbering device which is actuated to increase one unit at each printing operation of the machine; the type in the dater devices and the type of the serial numbering device are so disposed as to be in alignment with the type of the numeral wheels and print concurrently with them, and are inked by the same inking device.

This machine also includes a rotary printer upon which is mounted an indicia plate bearing the desired designations for printing a stamp form; the paper tapes pass through the rotary printer and the same tape receives a print from the indicia plate preparatory to receiving the print from the numeral printer, which operation makes a complete stamp.

An object of my invention is to provide a paper feed mechanism, wherein paper rolls are placed within the machine, comprising one roll of paper tape bearing upon one surface a gummed area, and a second roll of plain paper tape on which a duplicate of the original stamp may be printed; and wherein these tapes may be so conveyed through the machine as to receive the work to be done upon them in the proper manner, and to be so disposed of at the completion of a printing operation as to give the results required in this character of work.

An object of my invention is to provide a paper feeding mechanism wherein paper tapes may be conveyed through a parcel post machine in such a manner that they will be properly positioned to receive the several printing operations thereon, and wherein the original stamp tape will be forwarded to a point, upon the completion of the printing operation, wherein the printed stamp length may be severed from the paper tape and thereafter discharged from the machine; and the duplicate tape wound upon a spindle provided for the purpose within the machine, which may be removed at the will of the operator.

Another object of my invention is to provide a means of operating the forwarding mechanism for the paper tapes, which, in the particular type of machine disclosed herein, requires that the timing of the forwarding movements of the conveying mechanism be so timed as to operate coordinately with the other operations of the machine, and wherein the rotary printer being operated with continuous movement during the cycle of a printing operation of the machine, rotates to a point wherein the indicia plate reaches the printing zone at a predetermined time spacing within the cycle of operation. I have provided a clutching mechanism which engages to drive the conveying mechanism, and the engagement of this clutch occurs at a point in the printing operation cycle where the indicia plate has reached the printing zone and requires that the paper tape be forwarded from that point on until the indicia plate has entirely passed the printing zone.

Another object of my invention is to provide means for disposition of the paper tapes at the printing zone of the numeral printer, wherein the tapes are guided and separated for the purpose of having interposed therebetween an inked ribbon, for the purpose of printing a duplicate stamp upon the second tape, and wherein the paper tapes are so disposed in relation to the numeral printer that the prints made thereon will coincide with the stamp form just printed by the rotary printer from the indicia plate thereon.

This guide plate element further provides means for separating the original stamp tape from the duplicate stamp tape whereby the original stamp tape is forwarded independently of the duplicate stamp tape and in a different direction; the original stamp tape forwards the printed section constituting the stamp a stamp length to the receiving guide incorporated with the moistener, and upon the stamp tape being forwarded the stamp length, I have provided a knife for severing the printed stamp from the tape at the proper point.

The duplicate stamp tape having been separately conveyed from the printing zone of the numeral printer, is thereupon wound upon a spindle, which is power driven, and which may be removed from the machine together with the paper tape wound thereon by the operator for the purpose of taking it to the post office, together with the parcel post packages operated upon, where it may be used for checking against the original stamps attached to the several parcel post packages handled.

Another object of my invention is to provide a discharging means wherein is incorporated a receiving guide plate for receiving a cut stamp from the printing mechanism, also a moistening device wherein the gummed area of the stamp may be properly moistened for the purpose of attaching it to a parcel post package, and means incorporated therein for forwarding the stamp upon a discharge plate where the operator may obtain it from the machine in a moistened condition ready to be applied to a parcel post package.

Another object of my invention is to provide a mechanism upon which are mounted the rolls of paper tape for supplying the machine, and which comprises a unit which will be hereinafter termed the paper roll holder; this unit includes an electrical device with switching elements and contacting elements; the purpose of this device is to stop the machine from operating further upon the exhaustion of either of the paper rolls, or upon the breaking of either of the paper tapes while being unwound.

An object of my invention is to provide a means for stopping the machine and preventing further operation of it upon exhaustion of either of the paper rolls, or upon the breaking of the paper tape, while being unwound from either of the paper rolls, or in the event that the paper roll has been wound with a broken paper tape, and wherein the switching mechanism will be automatically operated upon the absence of a paper tape between the electrical contact points provided for the purpose of having the paper tapes run continuously through them, thus keeping the electrical contact points separated.

Upon absence of the tape from between said contacts, the contact points will contact, closing a circuit to the solenoid, which is thereupon energized and which therefore operates the switching elements, one of which breaks the motor circuit, another of which breaks the solenoid circuit upon the operation of the solenoid, and at its other point of travel closes the circuit extending to a signal lamp visible to the operator of the machine, the purpose of which is to notify the operator that the cause of the stopping of the machine is trouble in the paper-roll holder.

Another object of my invention is to provide a series of electrical circuits for the operation of the parcel post machine, parts of which are controlled by the presence or absence of the paper tapes between certain electrical contacts provided for the purpose of controlling certain portions of the electrical circuits upon the presence or absence of the paper tapes between said electrical contacts; for the purpose of more clearly illustrating the electrical circuits of the machine, I have illustrated the complete electrical arrangement of the machine upon an individual drawing included herewith.

To the above purposes my invention consists in the novel construction, arrangement and combination of parts as hereinafter fully, clearly and concisely described and definitely pointed out in my claims and illustrated by the accompanying drawings, (4 sheets), in which—

Fig. 1 is a view from the left in elevation of those portions of a parcel post machine which comprise, are attached to, and influenced by the paper rolls, the paper tapes and their travel through the machine.

Figure 2:
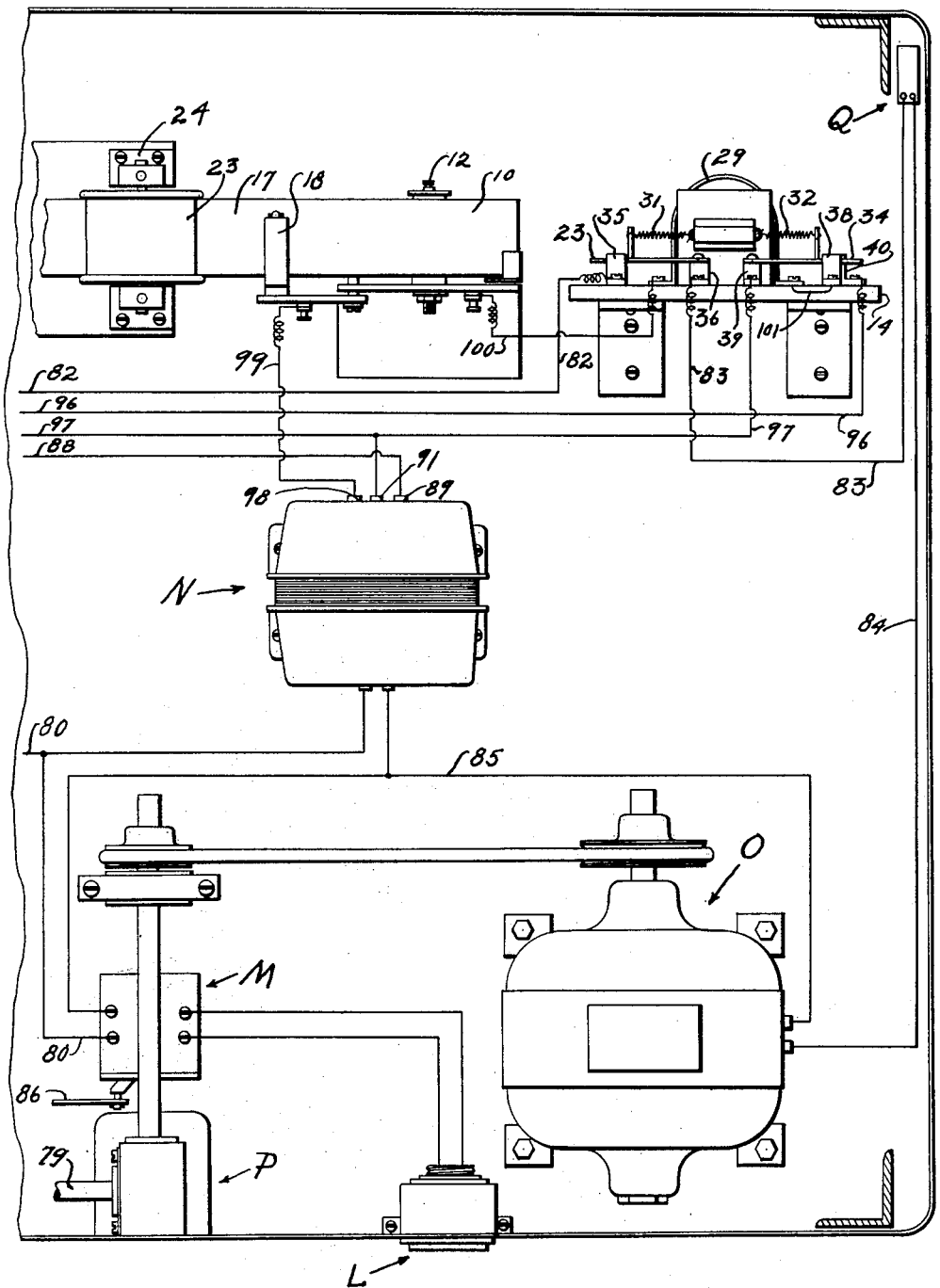
Figure 3:
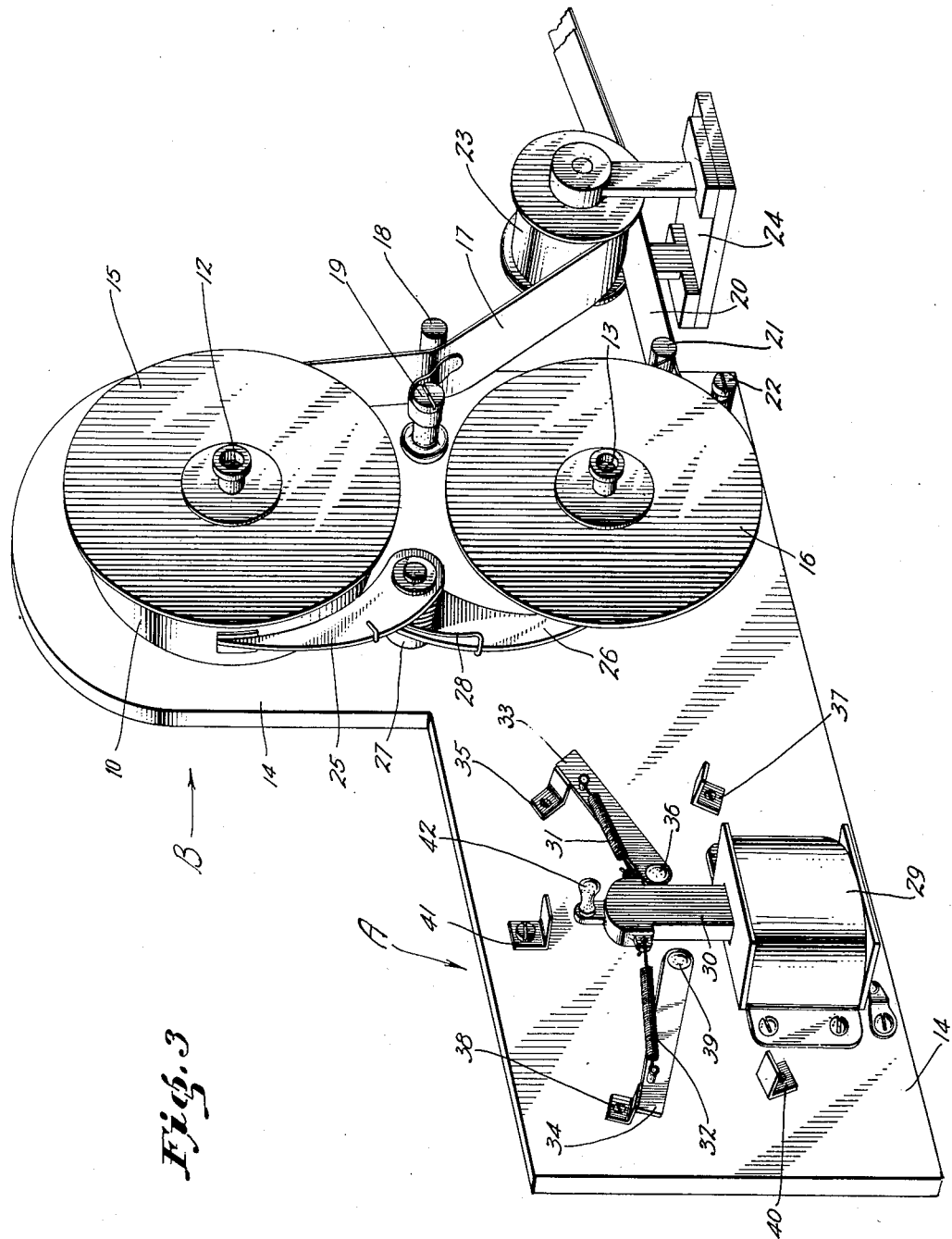
Figure 4:
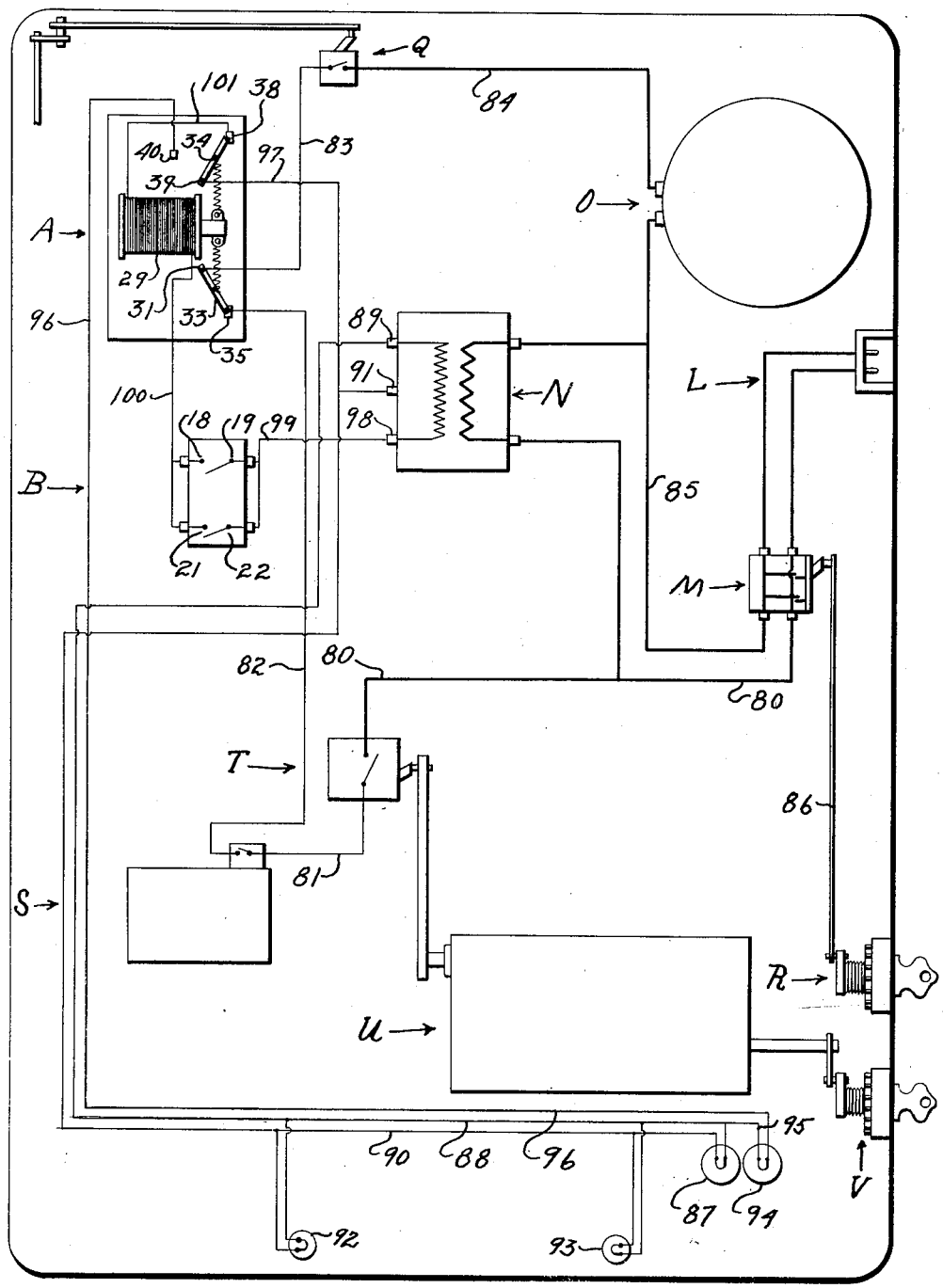

Fig. 2 is a plan view of the rear portion of a parcel post machine, the bottom of the figure as drawn being on the right-hand side of the parcel post machine as operated, and the top portion of the figure being on the left-hand side of the machine as operated, and it is on the left-hand side where the paper rolls are situated and wherein the paper tapes travel from the rear of the machine towards the front of the machine;

Fig. 3 is a view in perspective from the left and towards the rear of the paper roll carrier which includes the solenoid and the switching mechanism;

Fig. 4 is a diagrammatic plan view of the electrical circuits included in the parcel post machine wherein the lower portion of the figure represents the front of the machine as operated, and the top portion of the figure represents the rear of the machine, and the right-hand side of the figure represents the right-hand side of the machine, and the left-hand side of the figure represents the left-hand side of the machine, where the paper feeding mechanism is situated.

Referring to Fig. 1, the series of units of the machine which are adjacent to the travel of the paper tapes and which bear relationship to the various operations related to the printing of a stamp, comprise particularly those shown in this figure, of which A is the solenoid for operating the switching elements which are incorporated as a part of the solenoid; the paper roll carrier B, which supports the rolls of paper and has attached thereto the electrical contacting elements; the rotary printer C, which prints the indicia upon the stamp tape; the clutch D which controls the operations of the conveying elements E; the numeral printer F, adjoining which is located the ribbon device G; the paper re-wind spindle H; the moistening and discharge unit J; and, located in the background of the figure at the right-hand side, is shown the keyboard K, by means of which the machine is operated.

Referring to Figs. 2 and 4, there is disclosed thereon a source of electrical energy for this machine comprising an attachment outlet L wherein an electric plug may be inserted for connecting the machine to an electric line supplying power; a main switch M which may be key-operated from the outside of the machine by an operator; a transformer N for reducing a higher voltage current to a lower voltage current for use in parts of the machine; an electrical motor O for driving the machine; a speed reducing element P for controlling the supply of power to the machine; and a door-operated switch Q for opening the motor circuit when the casing to the machine is opened by means of the door to provide access for the operator to renew the paper supply or to ink the printing mechanism.

Referring to Fig. 4, which is a diagrammatic view of the wiring circuits of the machine, the motor O is situated at the upper right-hand portion of the figure; the plug attachment L adjoining it on the right; immediately below is the main switch M operated by key-lock R; near the center is the transformer N; at the upper end is the door switch Q; on the left-hand side of the machine where the paper supply is situated is shown the solenoid and its connected switch A; immediately below it are the paper roll carrier contacts shown in the form of the switches B; further below on the figure is illustrated the dater switch S which is a part of the recited numeral printer F; adjacent to it on the right is the meter-controlled switch T controlled by a control meter indicated at U; this control meter is adapted to be set by means of the key-lock V for a predetermined amount of postage, and which, upon exhaustion of this pre-set amount of postage operates to open the switch T, thus breaking the motor circuit until such time as the control meter U is re-set by means of the lock V.

By reference to Fig. 3, it will be seen that the paper rolls 10 and 11 are mounted upon the spindles 12 and 13 which are secured to the frame 14, and which are supplied on the outer ends with guard flanges 15 and 16 which retain the paper rolls in position; as the paper tape unrolls it is passed between two sets of contact points for each paper, the upper paper roll 10 having its unwound portion of tape 17, which is the gummed tape supplied for making the original stamp, and which passes through electrical contacts 18 and 19; the duplicate paper roll 11 has its unwound portion of the tape 20 passing between two electrical contacts 21 and 22; thereafter the two paper tapes travel together under the guide roller 23 rotatably mounted in the bearing frame 24; the paper rolls 10 and 11 are tensioned by the brakes 25 and 26 mounted on the supporting member 27 tensioned by means of the spring 28.

The solenoid, as disclosed in Fig. 3, together with the switching elements combined therewith, is mounted on the frame 14 and comprises the solenoid coil 29, and the core 30, which is supported in a position to be operated upon by the solenoid coil 29 when energized, by means of the springs 31 and 32; one end of each of these springs 31 and 32 is secured to the solenoid core 30, the other end of the spring 31 is secured to the switching arm 33, and the other end of the spring 32 is secured to the switching arm 34.

The switching arm 33 is operated between two contact members, one of which, 35, is connected to one side of the motor circuit, while the switch arm 33 itself is connected through its mounting 36 with the other side of the motor circuit, the other contact 37 being merely a stop for the switch arm 33.

The switch arm 34 operates between two similar contacts, one of which, 38, is connected to one side of the solenoid circuit, the switch arm 34 being connected by means of the mounting 39 directly to the transformer N, thus providing one live side of the circuit; the other contact 40 is connected to one side of the light circuit for a signal light for the operator; the other side of this circuit being the switch arm 34.

To limit the vertical movement of the solenoid core 30 there is provided a stop 41; and for the purpose of manually returning the solenoid core 30, and its connected switch arms 33 and 34, to the normal position, which is the position shown in Fig. 3, I have provided a lifting arm 42 for that purpose. I have required manual return of the solenoid unit to its original position to require the operator of a machine to actually inspect the parts of the machine attached hereto, and by forcing him to manually return the solenoid unit it concentrates his attention on these parts of the machine to see that they are correctly related for proper operation of a machine.

As disclosed in Fig. 1, during the forward travel of the tapes 17 and 20 they are next engaged by the rotary printer C, which consists of the drum 43, on one side of which is mounted the indicia plate 44, the drum 43 being hollow and containing an internal ink reservoir, not shown, which is covered, on the portion of it which extends to the periphery of the drum 43, with an absorbent pad constituting the ink pad 45, which is contacted by the ink distributing roller 46, which is spring-mounted in carriers 47 mounted on the frame 48.

For the purpose of providing a platen for the indicia plate 44 to act against, I have provided the platen roller 49 which is included as a member of the conveyer assembly, this platen roller 49 being rotatably mounted in the frame 48 by means of the shaft 50, to which it is secured, and which is provided on one end with a cam 51, which is adapted to engage a cam roller 52 mounted on the rocking arm 53, which engages the ink ribbon winding mechanism 54, which includes a re-winding mechanism and actuates each of the two spindles 55 and 56 to alternately wind the ink ribbon 57 upon them.

The other end of the shaft 50 is provided with a gear, not shown, which engages one of the several gears comprising the gear train actuated by the clutch D, wherein power is transmitted to the conveyer elements during a certain interval within the printing cycle of the machine. This clutch D is designed to be engaged and operate the said gear train for approximately one-third of the printing cycle and is so constructed that it will disengage at a definite predetermined point upon completion of each operation, and thereby stop the paper tapes in a proper position relative to the printers and the moistener.

Additional members of the conveyer assembly include a pair of rollers 58 between which the paper tapes are gripped and forwarded, and which are gear related to the driven element of the clutch D.

The next contacting members which act upon the paper tape include the guide plates 59 into which the paper tapes are fed, and which separate them to provide for an ink ribbon 57 to be placed therebetween for the purpose of printing a duplicate stamp when the numeral printer F is operated. Upon operation of the clutch D, and the consequent forwarding of the paper tapes through the guide plates 59, and past the numeral printer F after it has acted upon them, the original stamp tape 17 is passed forward into a receiving plate 60, and upon the entire stamp length having been forwarded past the printing point of the numeral printer F, the printed stamp is severed from the balance of the paper tape 17 by a knife element 61, and the severed stamp may thereafter be discharged from a machine by an operator at will.

The discharging and moistening unit J is placed at the front edge of the machine, and comprises a tank 62 adapted to hold a moistening liquid; a moistening roller 63 which conveys the moistening liquid to the gummed area of a stamp; a pressure roller 64, which is normally held out of the path of the severed stamp, and which is mounted by means of a rotatable shaft 65 in a rocking frame 66 rockably mounted on the drive shaft 67, which is supported by standards 68.

To operate the moistener for the purpose of moistening and discharging a stamp, I have provided a handle 69 which is secured to the shaft 67, and which rotates a gear wheel 70 mounted thereon; the gear wheel 70 engages a gear 71 which further engages a gear 72 mounted on the shaft 73 to which the moistening roller 63 is secured, thereby rotating the roller 63 to forward the moistening liquid to the gummed area of the stamp. The rocking frame 66 is tensioned into its disengaged position by means of a spring 74; the pressure roller shaft 65 is provided on one end with a gear 75 which engages and is driven by the drive gear wheel 70.

Upon actuation of the handle 69 by an operator, the gear wheel 70 turns, rotating the moistening drum 63 to bring a moistened area of the circumferential surface of the drum to the point where it will contact the gummed area of a stamp prior to the contacting at this same point of the pressure roller 64; the same rotation of the gear 70, by means of its contact with the gear 75, and by the resistance set up by the contacting parts, will rock the rocking frame 66 downwardly to a point where the pressure drum 64 engages the stamp lying between this drum and the moistening drum 63, and the pressure created by this contact will cause the gear 70 to rotate the gear 75, and consequently the pressure drum 64 and the combined drive movement of the gears.

The pressure drum 64 and the moistening drum 63 gripping the stamp between them will forward it on to the discharge plate 76 lying in the discharge port 77, and at the completion of rotation of the gear 70 the stamp has been passed beyond the contact point of the rollers 63 and 64 and lies wholly beyond that point upon the discharge plate 76; upon the release by an operator of the handle 69 the gears and the rocking frame 66 return to original position by means of the tension spring 74. The discharge plate 76 is provided with slots, not shown, by means of which the excess moisture is drawn from off the gummed surface of the stamp as it passes thereover, by means of the capillary attraction provided by the size of these slots.

The winding spindle H, shown in Fig. 1, receives the duplicate tape 20 from the guide plates 59 at the discharge point, after operation upon it by the numeral printer, and being power driven, winds the tape upon it where it may be removed by an operator at will.

The various other parts of the parcel post machine have practically no direct bearing upon the operation of the paper feed mechanism except in the degree with which they control the operations of the machine. In view of the fact that the machine is so built that a printing operation cannot occur until the proper manipulations have been executed by an operator preparatory to a printing operation, I have not described these various units and their operation, as being unnecessary to the operation of the paper feed mechanism; the clutch D is actuated by a main drive shaft, not shown, which is started and stopped for the printing operation by means of a clutching mechanism, not shown, which is operated by means of the key 78 shown in Fig. 1, and this operation of the clutch engages the recited drive shaft with a source of power, which in this machine is illustrated by Fig. 2 in the motor O, and its connections, to the speed reducing element P and the drive shaft 79.

I will now describe the operations of the electrical system incorporated into this machine, and more particularly the portions of that system which are actuated by the paper tapes 17 and 20 in their disposition thereto.

Referring to the diagrammatic view in Fig. 4, the source of power is shown at L, and assuming that the switch M is closed, the current will be transmitted directly to the transformer N, and one connection will be made from the main line directly to the motor O. The other side of the circuit to motor O is carried through a series of switches, each of which is in series with the circuit for the purpose of breaking the circuit at any point wherein any operation occurs where that is required; the main lead wire 80 is carried to a control meter switch T, and, assuming that said switch T is closed ready for operation, the switch circuit wire 81 is connected therefrom to the dater switch S, and assuming dater switch S to be closed for operation, a connecting switch wire 82 connects therefrom to the contact 35 in the solenoid switch A, and assuming that the switch arm 33 is closed to the contact 35, there is connected a connecting switch wire 83 which is connected to the door switch Q, and assuming that the door is closed and the switch Q closed, there is a connecting wire 84 from the switch Q to the motor O; therefore with these several switches closed the circuit is complete from the lead wire 80 to the motor and with the other lead wire 85 completing the circuit. When the operator desires to place the machine in condition to operate the mechanism therein, he may operate the lock switch R, which, by the connections 86, operates the main switch M, and closes the connections to the incoming power source, whereupon the motor O will start and actuate the mechanism upon contact with the clutch.

For the purpose of advising the operator that there is electrical current present in the machine, I have provided a pilot light 87 which will be illuminated upon the operation of the switch M; this pilot light is connected to a main lead wire 88 which is connected to one of the contacts 89 on the transformer N; the other wire supplying current to the pilot light 87 is the feed wire 90 which is connected to the contact 91 on the transformer N, which, together with the contact 89 provides in this machine a current of approximately 8 volts; for the purpose of illuminating the dial on the scale, not shown, which is built as an integral part of a parcel post machine, I have provided two dial lights 92 and 93 which are connected directly to the lead wires 88 and 90 and which, therefore, are illuminated when the key lock R is operated.

For the purpose of advising the operator of trouble in a paper feed mechanism I have provided a signal light 94, one wire of which, 95, is connected to the feed wire 88 and the other wire of which, 96, is connected to contact 40 in the solenoid switch assembly A; to complete this circuit the solenoid switch arm 34 is conencted at 39 with a connecting wire 97 which is connected to the same terminal 91 on the transformer N to which the other side of the recited lamps are connected, thus giving a current of approximately 8 volts for this work.

For the purpose of providing a current of proper strength for operating the solenoid 29, I have connected an additional terminal 98 on the transformer N, which, together with the terminal 91, in this particular form of transformer, provides a current of approximately 24 volts, the line composed of the feed wire 99 and the feed wire 97, together providing a voltage of approximately 24 volts. The feed wire 99 is connected to paper roll contacts 19 and 22 and these contacts are normally held apart from the contacts 18 and 21 by means of the paper tapes lying therebetween; the contacts 18 and 21 are connected to the solenoid by means of the connected wire 100 which is connected directly to the solenoid 29; the other side of the circuit from the solenoid 29 is connected by means of connection wire 101 to the switch contact point 38.

Assuming that the various recited switches are closed with the exception of the contact points 18, 19, 21 and 22, the electrical system is in normal functioning condition; upon one of the several switches, namely, S, T, Q, and the solenoid switch A, being open from one of various causes, the motor circuit will be broken and the motor will stop; and inversely, should either of the pairs of contacts, 18 and 19, and, 21 and 22, be closed by absence of the paper tape between these contacts, the circuit originating at terminal 98 with the transformer N will be completed to the solenoid, and the solenoid will be operated to actuate the two switch arms 33 and 34; the switch arm 33 will break the circuit to the motor, thus stopping the motor O; the switch arm 34 in leaving the contact 38 will break the solenoid circuit, thus preventing over-heating and injury to the solenoid coil 29, the switch arm 34 upon contacting the contact 40 will close the lighting circuit to the signal lamp 94, and thus provide means of notifying the operator of the machine the location of the trouble which has stopped the motor; the operator becoming conversant with the operation of this machine will readily understand the meaning of this signal light 94, in view of the fact that when this signal light is turned on from action of the solenoid switches at A, while the pilot light 87 is still burning, he will understand that there is trouble in the paper feed mechanism, but should the pilot light 87 and the dial lights 92 and 93 be extinguished it will notify him that the supply of current to the machine has ceased.

While the form of mechanism here shown and described, is admirably adapted to fulfil the objects primarily stated, it is to be understood that it is not intended to confine the invention to the one form of embodiment herein disclosed, for it is susceptible of embodiment in various forms, all coming within the scope of the claims which follow.

I claim:

1. In a device of the character disclosed, the combination with printing mechanism, of a paper tape supply device adapted to support rolls of paper tapes for forwarding to said printer; an electric motor switch circuit; a switch connected in series in said circuit normally maintained closed; a solenoid circuit including a solenoid; switches in the path of movement of the paper tapes, and normally held open by said tapes; said solenoid adapted to be operated by one of said paper tape switches when the tape is out of the path of said switch, to open said motor circuit switch; and a solenoid circuit switch normally closed, adapted to be operated by said solenoid to open said solenoid circuit when said solenoid circuit is closed by said paper tape switches.

2. In a device of the character disclosed, the combination with printing mechanism, of a paper tape supply device adapted to support a roll of paper tape for forwarding to said printer; an electrical motor switch circuit; a normally closed switch in series in said circuit; a solenoid circuit and its solenoid; a switch for opening and closing the solenoid circuit, said switch being in the path of movement of the paper tape, and normally held open by contact of said tape therewith; said solenoid adapted to be operated by said paper tape switch upon non-contact of paper tape therewith, to open said motor circuit switch; a normally closed solenoid circuit switch adapted to be operated by said solenoid to open said solenoid circuit when the solenoid circuit is closed by said paper tape switch; and signal means operated by the solenoid.

GEORGE W. LAWRENCE.